United States Patent [19]

Avery et al.

[11] Patent Number: 4,943,383
[45] Date of Patent: Jul. 24, 1990

[54] NOVEL LUBRICANT EPOXIDES

[75] Inventors: Noyes L. Avery, Gwynedd Valey, Pa.; Andrew G. Horodysky, Cherry Hill, N.J.; Derek A. Law, Yardley, Pa.; Leslie R. Rudnick, Lawrenceville, N.J.

[73] Assignee: Mobil Oil Corporation, New York, N.Y.

[21] Appl. No.: 210,453

[22] Filed: Jun. 23, 1988

[51] Int. Cl.$^5$ ............ C01M 107/22; C01M 145/00
[52] U.S. Cl. .................... 252/52 A; 252/51.5 A; 252/51.5 R; 252/56 D; 252/56.5; 585/10; 585/12; 585/18; 502/305; 502/319
[58] Field of Search .......... 252/52 A, 51.5 A, 51.5 R, 252/56 D, 56 S; 502/305, 319, 12, 18; 585/10, 520, 526, 530

[56] References Cited

U.S. PATENT DOCUMENTS

| | | | |
|---|---|---|---|
| 575,702 | 5/1959 | Pitzer | 585/510 |
| 2,826,620 | 3/1958 | Matuszak | 585/332 |
| 3,120,547 | 2/1964 | Dieckelmann | 260/348.5 |
| 3,404,163 | 10/1968 | Budde, Jr. et al. | 260/348.5 |
| 3,780,128 | 12/1973 | Shubkin | 252/565 |
| 3,953,480 | 4/1976 | Delavarenne et al. | 549/526 |
| 4,134,846 | 1/1979 | Machleder et al. | 44/75 |
| 4,548,390 | 4/1986 | Dieckelmann et al. | 260/348.5 L |
| 4,613,712 | 12/1986 | Bridger | 585/10 |
| 4,647,678 | 3/1987 | Eckwert et al. | 549/528 |
| 4,827,064 | 5/1989 | Wu | 585/10 |
| 4,827,073 | 5/1989 | Wu | 585/530 |

OTHER PUBLICATIONS

Weiss et al., "Surface Compounds of Transition Metals", J. Catalysis, 88, p. 424–430 (1984).

*Primary Examiner*—Margaret B. Medley
*Attorney, Agent, or Firm*—Alexander J. McKillop; Charles J. Speciale; Malcolm D. Keen

[57] ABSTRACT

Epoxy functionalized polyalpha-olefin lubricants compositions are prepared with superior properties by epoxidizing the olefinic bond of oligomers prepare by oligomerizing $C_6$–$C_{20}$ alpha-olefins with reduced valence state chromium catalyst on silica support. The invention encompasses a product of reaction made by epoxidizing $C_{30}+$ polyalpha-olefin oligomeric hydrocarbon lubricant having a branch ratio of less than 0.19 and pour point below $-15°$ C. in the presence of an epoxidizing amount of an epoxidizing agent wherein said product comprises a mixture of 2-dialkyl oxirane and 1,2-dialkyl oxirane having between an average of $C_{30}$ and $C_{1000}$ carbon atoms, said mixture having a branch ratio of less than 0.19 and pour point below $-15°$ C. The invention further encompasses blends and additive compositions of the novel epoxidizing polyalpha-olefins.

29 Claims, No Drawings

NOVEL LUBRICANT EPOXIDES

This invention relates to epoxidized polyalpha-olefin oligomers exhibiting superior lubricant properties and stability. In particular, the invention relates to the epoxidation product of novel polyalpha-olefins having essentially terminal olefinic unsaturation which provides lubricants that possess high viscosity index, low pour point and improved wear resistant characteristics. The invention further relates to blends of novel epoxidized polyalpha-olefin oligomers with other lubricants and polymer systems and the utilization of these novel lubricant epoxides as additives for lubricant compositions.

BACKGROUND OF THE INVENTION

The formulation of lubricants typically includes an additive package incorporating a variety of chemicals to improve or protect lubricant properties in application specific situations, particularly internal combustion engine and machinery applications. The more commonly used additives include oxidation inhibitors, rust inhibitors, antiwear agents, pour point depressants, detergent-dispersants, viscosity index (VI) improvers, foam inhibitors and the like. This aspect of the lubricant arts is specifically described in Kirk-Othmer "Encyclopedia of Chemical Technology", 3rd edition, Vol. 14, pp477-526, incorporated herein by reference. Considering the diversity of chemical structures represented by the plethora of additives incorporated in a typical lubricant formulation, and the quantity in which they are added, the artisan in the lubricant formulation arts faces a substantial challenge to provide a homogeneous formulation which will remain stable or in solution during inventory and during use. Lubricants, particularly synthetic lubricants of the type of interest in the instant invention, can be hydrogenated olefins. Due to their relatively non-polar hydrocarbon structure they are often incompatible with polar additives such as antioxidants, antirust and antiwear agents, etc. Accordingly, in order to render the lubricants compatible with the polar additives large amounts of expensive polar organic esters must be added to the formulation. Useful commercial formulations may contain 20% percent or more of such esters as bis-tridecanol adipate for example, solely to provide a fully homogeneous lubricant blend of lubricant and additive.

Modifying the solvent properties of lubricants with solubilizing agents such as organic esters, while solving the problem of how to prepare stable blends with lubricant additives, creates or accentuates other performance related problems beyond the added burden on cost of the product. Performance problems can include volatility, thermal stability, oxidative stability and the like. Accordingly, workers in the field are challenged by the need to incorporate the desirable properties of additives into lubricants, without incurring the usual physical performance and cost liabilities.

One class of lubricants of particular interest in the present invention are synthetic lubricants obtained by the oligomerization of olefins, particularly $C_6$–$C_{20}$ alpha olefins. Catalytic oligomerization of olefins has been studied extensively. Many catalysts useful in this area have been described, especially coordination catalyst and Lewis acid catalysts. Known olefin oligomerization catalysts include the Ziegler-Natta type catalysts and promoted catalysts such as $BF_3$ or $AlCl_3$ catalysts. U.S. Pat. No. 4,613,712, for example, teaches the preparation of isotactic alpha-olefins in the presence of a Ziegler type catalyst. Other coordination catalysts, especially chromium on a silica support, are described by Weiss et al in Jour. Catalysis 88, 424–430 (1984) and in Offen. DE 3,427,319.

Poly alpha-olefin (PAO) oligomers as reported in literature or used in existing lube base stocks are usually produced by Lewis acid catalysis in which double bond isomerization of the starting alpha-olefin occurs easily. As a result, the olefin oligomers have more short side branches and internal olefin bonds. These side branches significantly degrade their lubricating properties. Recently, a class of synthetic, oligomeric, polyalpha-olefin lubricants, referred to herein as HVI-PAO, has been discovered, as reported in U.S. patent application Ser. No. 946,226 filed Dec. 24, 1986 now abandoned, with a regular head-to-tail structure and containing a terminal olefinic bond. The HVI-PAO oligomers are produced by the oligomerization of $C_6$–$C_{20}$ 1-alkene in contact silica supported chromium oxide catalyst which has been reduced to a lower valence state. These unsaturated lubricants have shown remarkably high viscosity index (VI) accompanied by surprising low pour points and are especially characterized by having a low branch ratio of methyl to methylene groups, as defined hereinafter. While these favorable properties can be further improved by the use of lubricant additives usually containing polar functionality to confer antiwear, anticorrosive, etc. attributes on the novel lubricant, they cannot be so improved without incurring the aforementioned problems associated with the addition of additives.

Accordingly, it is an objective of the instant invention to enhance the properties of HVI-PAO by incorporating additive functional groups into the lubricant molecular structure.

It is an objective of the instant invention to provide improved lubricant or fuel compositions having superior wear and anticorrosive characteristics by epoxidizing the olefinic bond of HVI-PAO.

Yet another objective of the present invention is to provide blends of epoxidized HVI-PAO with other lubricants yielding mixtures with improved properties and lower cost.

A further object of the invention disclosed herein is to provide superior lubricants by incorporating performance-enhancing additives into epoxidized HVI-PAO as a mixture therein.

SUMMARY OF THE INVENTION

It has been discovered that unsaturated HVI-PAO can be epoxidized to a product having superior lubricant properties, particularly in wear resistance, while exhibiting surprising stability to acids and alkali commonly found in service applications after each use. Most remarkably, it has been discovered that the epoxidation of HVI-PAO can be achieved without degrading the desirable viscometric properties unique to the structure of HVI-PAO as prepared. Accordingly, the product of epoxidation retains the high viscosity index (VI) and low pour point characteristic of the unsaturated oligomer while adding the important properties, such as improved wear resistance. It has also been discovered that epoxidized HVI-PAO, herein sometimes referred to as E/HVI-PAO, is useful in blends with other lubricants and can, itself, be employed as an additive to other lubricants to improve VI or wear resistance.

More particularly, the invention involves a product of reaction made by epoxidizing $C_{30}+$ polyalpha-olefin oligomeric hydrocarbon lubricant having a branch ratio of less than 0.19 and pour point below $-15°$ C. in the presence of an epoxidizing amount of an epoxidizing agent wherein said product comprises a mixture of 2-dialkyl oxirane and 1,2-dialkyl oxirane having between an average of $C_{30}$ and $C_{1000}$ carbon atoms, said mixture having a branch ratio of less than 0.19 and pour point below $-15°C$.

The invention comprises a lubricant or fuel mixture of oligomers having the recurring polymeric structures

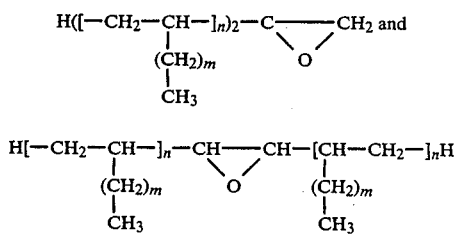

where m is 3 to 12 and the combination of n recurring units is 3 to 500, but preferably where m is seven and the average n is fifteen and having a viscosity index greater than 130 and a pour point less than $-15°$ C.

Further, the invention discloses a method to improve wear in an internal combustion engine by using E/HVI-PAO which also may be formulated in blends with other lubricants or additives.

DETAILED DESCRIPTION OF THE INVENTION

The epoxidation of olefins is a well known reaction as described in chapter 7, Synthetic Organic Chemistry, by Wagner & Zook, 1956, published by John Wiley & Sons, Inc., incorporated herein by reference. Typical epoxidizing agents are aliphatic and aryl percarboxylic acids and hydrogen peroxide. Any of several commonly used epoxidation methods can be advantageously in this invention.

Epoxidized hydrocarbon oils are known and have been used in lubricating oils. However, the epoxides described herein are derived from unique HVI-PAO olefins and are therefore themselves unique. These HVI-PAO olefins have a branch ratio of less than 0.19 with a pour point of less than $-15°$ C. It has now been found that epoxidized hydrocarbon oils of the high viscosity index mono olefins, as generally described in U.S. patent application Ser. No. 946,226, provide a composition which has high stability to aqueous acid and base. Furthermore, the epoxide compositions retain virtually the same highly desirable viscosity/temperature characteristics as the olefin. This provides an oxygenated functionalized hydrocarbon lubricant which can be manufactured from the hydrocarbon without increases in viscosity which often occur on chemical derivatization. These compositions also have significantly reduced iodine numbers than the corresponding olefins and therefore are potentially more thermally and oxidatively stable.

Furthermore, the epoxide functional group can serve as an intermediate for preparation of mono alcohols by epoxide ring reduction (I) or for preparation of diols (II) or beta-hydroxy mercaptans (III).

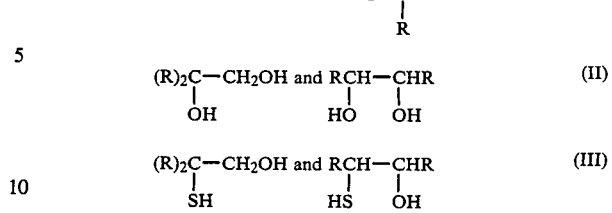

where R is the HVI-PAO moiety.

Derivatives of (I), but not limited to esters, ethers, and polyethers can possess excellent lubricating properties coupled with improved additive solubility and deposit solubility. This improves the antiwear properties of the lubricants and formulations derived from the functionalized hydrocarbon fluid.

Derivatives of II, including but not limited to esters, ethers and polyethers, can possess the above desirable properties also. Flexibility in formulation is possible by considering various combinations of monofunctional and polyfunctional fluids. In addition, esters from vicinal diol (II) derived from inorganic acids phosphites can possess improved antiwear and friction reducing properties, as well as having improved additives solubility. Borate esters derived from (II) can provide improved lubricating properties with friction reducing improvements over unfunctionalized hydrocarbon lubricant. Phosphorodithioates derived from (II) or (III) can provide improved antiwear and antioxidant properties over the unfunctionalized hydrocarbon lubricant.

EXAMPLE 1

A HVI-PAO having a nominal viscosity of 20 cs at 100° C. is prepared by the following procedure: 100 weights of 1-decene purified by nitrogen sparging and passing over a 4A molecular sieve is charged to a dry nitrogen blanketed reactor. The decene is then heated to 185° C. and 3.0 weights of a prereduced 1% Chromium on silica catalyst added together with an additional 500 weights of purified 1-decene continuously over a period of 7.0 hr with the reaction temperature maintained at 185° C. The reactants are held for an additional 5.0 hr at 185° C. after completion of the 1-decene and catalyst addition to complete the reaction. The product is then filtered to remove the catalyst and stripped to 270° C. and 2 mm Hg pressure to remove unreacted 1-decene and unwanted low molecular weight oligomers.

EXAMPLE 2

A HVI-PAO having a nominal viscosity of 149 cs at 100° C. is prepared by a procedure similar to that in Example 1 except that the 1-decene/catalyst addition time is 9.0 hr, the hold time after 1-decene/catalyst addition is 2.0 hr, and the reaction temperature is 123° C.

EXAMPLE 3

Approximately 50 grams of 20 cs epoxide from Example 1, 50 grams of toluene and 10 grams of deionized water are mixed. To this stirred mixture is added 0.276 grams (ca.0.5%) sodium hydroxide. The vessel is sealed and heated to 185°–195° C. for 19 hours at 175 psig. The reaction is cooled. The reaction mixture is poured into 100 ml of water and the phases are separated. The organic phase is washed with 1.0 ml of water. The separated organic phase is dried over MgSO$_4$, filtered and the solvent removed by rotary evaporation. The product is identical by TLC to the starting epoxide.

EXAMPLE 4

Approximately 50 g of epoxide of Example 2, 50 g of toluene, 9 g of water and 1.0 g of concentrated H$_2$SO$_4$ are heated at 170° C. 150 psig overnight (ca.16 hours). After workup as in Example 3, the product is identical to starting epoxide by TLC.

The foregoing epoxides were characterized without blending. Four-ball wear testing shows that the 30 cs epoxide is at least as good as the 20 cs olefin ,4.9 vs. 5.6, where the lower value indicates better performance.

In Table 1, the viscosity, VI, acid value and iodine number are compared for starting lube olefin and epoxidized product of Examples 1 and 2, as well as values for hydrogenated lube olefin. The results show the epoxidized product surprisingly retains the excellent viscometric properties of the starting lube olefin. Table 2 presents the results of Four-Ball Wear testing.

TABLE 1
Comparison of HVI-PAO and Epoxy HVI-PAO

| | HVI-PAO | | | | | |
|---|---|---|---|---|---|---|
| | unsaturated | | hydrogenated | | epoxidized | |
| | 20 cs | 145 cs | 20 cs | 145 cs | 20 cs | 145 cs |
| Visc (100° C.) | 18.76 | 197.96 | 19.0 | 145 | 20.43 | 153.65 |
| Visc (40° C.) | 126.87 | 1493.92 | 130 | 1414 | 146.89 | 1534.60 |
| Acid Value | | | <0.01 | <0.01 | 0.06 | 0.05 |
| I$_2$ No. | 30 | 10 | 1.7 | 1.8 | 1.45 | 0.59 |
| Ir (epoxy) | — | — | — | — | 840 cm$^{-1}$ | 840 cm$^{-1}$ |

TABLE 2
Four-Ball Wear Test

| Entry No. | Load (kg) | Time (min) | Speed (rpm) | Temp °F. | Test Oil | Wear Scar (mm) | Vol. ×10$^3$mm$^3$ | K × 10$^8$ Factor |
|---|---|---|---|---|---|---|---|---|
| 1 | 60 | 30 | 2000 | 200 | 20 cs olefin | 5.564 | 14852 | 31456 |
| 2 | 60 | 30 | 2000 | 200 | 130 cs olefin | 0.667 | 409.1 | 866.6 |
| 3 | 60 | 30 | 2000 | 200 | Examp. 1 | 4.904 | 8961 | 18981 |
| 4 | 60 | 30 | 2000 | 200 | Examp. 2 | 5.546 | 14661 | 31051 |

The hydrolytic stability and apparent thermal stability of the epoxide derived from HVI-PAO represents a method to mask a hydroxyl or diol functional group. The higher in-use temperature experienced by these epoxides as additives or basestocks would generate hydroxyl or diol derivatives. In addition the epoxide or products derived from the epoxide chemically or in use can serve to improve additive solubility, thereby reducing ester as a component. The epoxide can also serve as a water scavenger in use. By accepting water chemically, the epoxide can thereby serve as a rust inhibitor and protect internal combustion engines from corrosion.

HVI-PAO is a unique mono olefin and the oligomers produced by the methods described hereinafter contain at least 10% vinylidenic unsaturation, but may contain up to 90% vinylidenic unsaturation with the balance of the unsaturation internal, 1,2-dialkyl olefins wherein the alkyl groups are HVI-PAO moieties. Accordingly, epoxidation of HVI-PAO provides epoxy derivatives having the following structure:

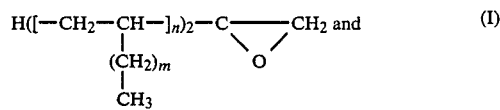

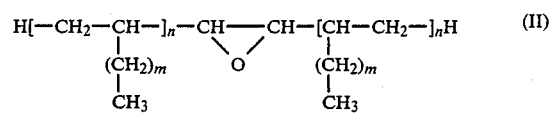

where m is 3 to 12 and the combination of n recurring units is 3 to 500, but preferably where m is seven and the average n is fifteen. The ratio of (I) to (II) can be between 1:20 and 20:1, but preferably the mixture contains at least 10% of (I).

The novel unsaturated polyalpha-olefin lubricants (HVI-PAO) employed in the present invention to prepare the epoxide derivatives and thereby incorporate desirable additive properties into the oligomer structure are described in the following section with respect to their preparation and properties.

Olefins suitable used to prepare HVI-PAO include those olefins containing from 6 to about 20 carbon atoms such as 1-hexene, 1-octene, 1-decene, 1-dodecene and 1-tetradecene and branched chain isomers such as 4-methyl-1-pentene. Also suitable for use are olefin-containing refinery feedstocks or effluents. However, the olefins used in this invention are preferably C$_6$-C$_{20}$ alpha olefins, and more preferably alpha-olefins containing 8 to 12 carbon atoms or mixtures of such olefins.

Oligomers of alpha-olefins in accordance with the invention have a low branch ratio of less than 0.19 and superior lubricating properties compared to the alpha-olefin oligomers with a high branch ratio, as produced in all known commercial methods. The branch ratio is defined as the ratios of CH$_3$ groups to CH$_2$ groups in the lube oil and are calculated from the weight fractions of methyl groups obtained by infrared methods, published in *Analytical Chemistry*, Vol. 25, No. 10, p. 1466 (1953).

$$\text{Branch ratio} = \frac{\text{wt fraction of methyl group}}{1 - (\text{wt fraction of methyl group})}$$

The new class of epoxidized alpha-olefin oligomers of this invention are prepared by oligomerization reactions in which a major proportion of the double bonds of the alphaolefins are not isomerized. The catalyst most preferred is a lower valence Group VIB metal oxide on an inert support. Preferred supports include silica, alumina, titania, silica alumina, magnesia and the like. Those porous substrates having a pore opening of at least 40 angstroms are preferred.

The supported metal oxide catalysts are preferably prepared by impregnating metal salts in water or organic solvents onto the support. Any suitable organic solvent known to the art may be used, for example, ethanol or acetic acid. The solid catalyst precursor is then dried and calcined at 200° to 900° C. by air or other oxygen-containing gas. Thereafter the catalyst is reduced by any of several various and well known reducing agents such as, for example, CO, $H_2$, $NH_3$, $H_2S$, $CS_2$, $CH_3SCH_3$, $CH_3SSCH_3$ and the like. Preferred are CO or $H_2$. The catalyst is very active for oligomerizing olefins at a temperature range from below room temperature to about 500° C. at a pressure of 0.1 atmosphere to 5000 psi. Contact time of both the olefin and the catalyst can vary from one second to 24 hours. The catalyst can be used in a batch type reactor or in a fixed bed, continuous-flow reactor.

In general the support material may be added to a solution of the metal compounds, e.g., acetates or nitrates, etc., and the mixture is then mixed and dried at room temperature. The dry solid gel is purged at successively higher temperatures to about 600° for a period of about 16 to 20 hours. Thereafter the catalyst is cooled down under an inert atmosphere to a temperature of about 250° to 350° C. and a stream of pure reducing agent is contacted therewith for a period of about one hour or more. Finally the catalyst is cooled down to room temperature and is ready for use.

The product HVI-PAO oligomers have a very wide range of viscosities with high viscosity indices suitable for high performance lubrication use. The product oligomers also have atactic molecular structure of mostly uniform head-to-tail connections with some head-to-head type connections in the structure. These low branch ratio oligomers have high viscosity indices, at least about 15 to 20 units higher than equivalent viscosity prior art oligomers, which regularly have higher branch ratios and correspondingly lower viscosity indices. These low branch oligomers maintain better or comparable pour points.

The following examples are presented merely for illustration purposes and are not intended to limit the scope of the present invention.

EXAMPLE 5

HVI-PAO Catalyst Preparation and Activation Procedure 1.9 grams of chromium (II) acetate, $Cr_2(OCOCH_3)_4 \cdot 2H_2O$, (5.58 mmole) (commercially obtained) is dissolved in 50 cc of hot acetic acid. Then 50 grams of a silica gel of 8–12 mesh size, a surface area of 300 m²/g, and a pore volume of 1 cc/g, also is added. Most of the solution is absorbed by the silica gel. The final mixture is mixed for half an hour on a rotavap at room temperature and dried in an open-dish at room temperature. First, the dry solid (20 g) is purged with $N_2$ at 250° C. in a tube furnace. The furnace temperature is then raised to 400° C. for 2 hours. The temperature is then set at 600° C. with dry air purging for 16 hours. At this time the catalyst is cooled down under $N_2$ to a temperature of 300° C. Then a stream of pure CO (99.99% from Matheson) is introduced for one hour. Finally, the catalyst is cooled down to room temperature under $N_2$ and ready for use.

EXAMPLE 6

The catalyst prepared in Example 5 (3.2 g) is packed in a ⅜" stainless steel tubular reactor inside an $N_2$ blanketed dry box. The reactor under $N_2$ atmosphere is then heated to 150° C. by a single-zone Lindberg furnace. Prepurified 1-hexene is pumped into the reactor at 140 psi and 20 cc/hr. The liquid effluent is collected and stripped of the unreacted starting material and the low boiling material at 0.05 mm Hg. The residual clear, colorless liquid has viscosities and VI's suitable as a lubricant base stock.

| Sample | Prerun | 1 | 2 | 3 |
|---|---|---|---|---|
| T.O.S., hr. | 2 | 3.5 | 5.5 | 21.5 |
| Lube Yield, wt % | 10 | 41 | 74 | 31 |
| Viscosity, cS, at | | | | |
| 40° C. | 208.5 | 123.3 | 104.4 | 166.2 |
| 100° C. | 26.1 | 17.1 | 14.5 | 20.4 |
| VI | 159 | 151 | 142 | 143 |

EXAMPLE 7

A commercial chrome/silica catalyst which contains 1% Cr on a large-pore volume synthetic silica gel is used. The catalyst is first calcined with air at 800° C. for 16 hours and reduced with CO at 300° C. for 1.5 hours. Then 3.5 g of the catalyst is packed into a tubular reactor and heated to 100° C. under the $N_2$ atmosphere. 1-Hexene is pumped through at 28 cc per hour at 1 atmosphere. The products were collected and analyzed as follows:

| Sample | C | D | E | F |
|---|---|---|---|---|
| T.O.S., hrs. | 3.5 | 4.5 | 6.5 | 22.5 |
| Lube Yield, % | 73 | 64 | 59 | 21 |
| Viscosity, cS, at | | | | |
| 40° C. | 2548 | 2429 | 3315 | 9031 |
| 100° C. | 102 | 151 | 197 | 437 |
| VI | 108 | 164 | 174 | 199 |

These runs show that different Cr on a silica catalyst are also effective for oligomerizing olefins to lube products.

EXAMPLE 8

As in Example 7, purified 1-decene is pumped through the reactor at 250 to 320 psi. The product is collected periodically and stripped of light products boiling points below 650° F. High quality lubes with high VI are obtained (see following table).

| | | Lube Product Properties | | |
|---|---|---|---|---|
| Reaction Temp.° C. | WHSV g/g/hr | V at 40° C. cS | V at 100° C. cS | VI |
| 120 | 2.5 | 1555.4 | 157.6 | 217 |
| 135 | 0.6 | 389.4 | 53.0 | 202 |
| 150 | 1.2 | 266.8 | 36.2 | 185 |
| 166 | 0.6 | 67.7 | 12.3 | 181 |
| 197 | 0.5 | 21.6 | 5.1 | 172 |

The 1-decene oligomers as described below are synthesized by reacting purified 1-decene with an activated chromium on silica catalyst. The activated catalyst is prepared by calcining chromium acetate (1 or 3% Cr) on silica gel at 500°–800° C. for 16 hours, followed by treating the catalyst with CO at 300°–350° C. for 1 hour. 1-Decene is mixed with the activated catalyst and heated to reaction temperature for 16–21 hours. The catalyst is then removed and the viscous product is distilled to remove low boiling components at 200° C./0.1 mmHg.

Reaction conditions and results for the lube synthesis are summarized below:

| Example NO. | Cr on Silica wt % | Calcination Temp. | Treatment Temp. | 1-decene/ Catalyst Ratio | Lube Yld |
|---|---|---|---|---|---|
| 9 | 3 | 700° C. | 350° C. | 40 | 90 |
| 10 | 3 | 700 | 350 | 40 | 90 |
| 11 | 1 | 500 | 350 | 45 | 86 |
| 12 | 1 | 600 | 350 | 16 | 92 |

| Branch Ratios and Lube Properties of Examples 9-12 Alpha Olefin Oligomers | | | | |
|---|---|---|---|---|
| Example No. | Branch $CH_3$ Ratios $CH_2$ | $V_{40°}$ C. | $V_{100°}$ C. | VI |
| 9 | 0.14 | 150.5 | 22.8 | 181 |
| 10 | 0.15 | 301.4 | 40.1 | 186 |
| 11 | 0.16 | 1205.9 | 128.3 | 212 |
| 12 | 0.15 | 5238.0 | 483.1 | 271 |

The HVI-PAO prepared as described herein have branch ratios of 0.14 to 0.16 providing lube oils of excellent quality which have a wide range of viscosities from 22.8 to 483.1 cS at 100° C. with viscosity indices of 130 to 271. Significantly, HVI-PAO as prepared contains terminal olefinic unsaturation. Formation of the derivatives described herein results in a lube which retains the superior VI and pour point properties and includes the favorable additive properties of the epoxy functionalization.

The following table summarizes the molecular weights and distributions of examples of HVI-PAO, as analyzed by high pressure liquid chromatography.

| Examples | 16 | 17 | 18 |
|---|---|---|---|
| V @ 100° C., cs | 18.5 | 145 | 298 |
| VI | 165 | 214 | 246 |
| number-averaged molecular weights, $MW_n$ | 1670 | 2062 | 5990 |
| weight-averaged molecular weights, $MW_w$ | 2420 | 4411 | 13290 |
| molecular weight distribution, MWD | 1.45 | 2.14 | 2.22 |

Weight average molecular weight of HVI-PAO between 300 and 150,000, number average molecular weight between 300 and 30,000 with molecular weight distribution (polydispersity) between and 5 can be obtained. Preferred weight average molecular weight range is between 300 and 45,000 and number average molecular weight between 300 and 24,000.

Compositions according to the present invention may be formulated according to known lube blending techniques to combine E/HVI-PAO components with various phenylates, sulphonates, succinamides, esters, polymeric VI improvers, ashless dispersants, ashless and metallic detergents, extreme pressure and antiwear additives, antioxidants, corrosion inhibitors, defoamants, biocides, friction reducers, anti-stain compounds, etc. Lubricants include greases or other solid lubricants containing additive quantities, 0.1 to 10%, or partial or complete replacement quantities (10-95%) of E/HVI-PAO.

The novel epoxy functionalized lubricants of the present invention may also be incorporated as blends with other lubricants and polymer systems in quantities ranging from 0.1 to 100% or may, themselves, be used as additives or in substitution for conventional additives. Lubricants and polymer systems which can be blended with the phosphite functionalized lubricants include: mineral oil comprising $C_{30}+$ hydrocarbons; hydrogenated polyolefins comprise polyisobutylene, polypropylene and polyalpha-olefins with a branch ratio greater than 0.19; vinyl polymers comprising polymethylmethacrylate and polyvinylcholoride; polyflurocarbons comprising polytetrafluoroethylene; polychloroflurocarbons comprising polychlorofluroethylene; polyesters comprising polyethyleneterephthate and polyethyleneadipate; polycarbonates comprising polybisphenol-A carbonate, polyurethanes comprising polyethylenesuccinoylcarbamate; polyacetals comprising polyoxymethylene; and polyamides comprising polycaprolactam.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A product of reaction made by epoxidizing $C_{30}+$ polyalpha-olefin oligomeric hydrocarbon lubricant having a branch ratio of less than 0.19 and pour point below $-15°$ C. in the presence of an epoxidizing amount of an epoxidizing agent wherein the product has a weight average molecular weight between 300 and 150,000 number average molecular weight between 300 and 30,000 and molecular weight distribution between 1 and 5.

2. The product of reaction of claim 1 wherein said product comprises a mixture of 2-dialkyl oxirane and 1,2-dialkyl oxirane having between an average of $C_{30}$ and $C_{1000}$ carbon atoms, said mixture having a branch ratio of less than 0.19 and pour point below $-15°$ C.

3. The product of claim 2 wherein said 2-dialkyl oxirane comprises at least 10% of said mixture.

4. The product of claim 2 wherein the ratio of carbon atoms to oxygen is at least 30 to 1.

5. The product of claim 2 having a viscosity between 3 cs and 500 cs, VI between 130 and 280 and a pour point between $-15°$ C. and $-70°$ C.

6. The product of claim 2 wherein said oxirane is $C_{30}$ oxirane.

7. The product of claim 1 wherein said polyalphaolefin comprises the unsaturated oligomeric or co-oligomeric residue of the oligomerization of $C_6-C_{20}$ 1-alkene in contact with reduced valence state chromium oxide catalyst on silica support at a temperature between 90° C. and 250° C.

8. The product of claim 7 wherein said catalyst has been treated by oxidation at a temperature of 200° C. to 900° C. in the presence of an oxidizing gas and then by treatment with a reducing agent at a temperature and for a time sufficient to reduce said catalyst to obtain unsaturated oligomers having a branch ratio of less than about 0.19.

9. The product of claim 7 wherein said reducing agent is CO, $H_2$, $NH_3$, $H_2S$, $CS_2$, $CH_3SCH_3$ and $CH_3SSCH_3$.

10. The product of claim 7 wherein the support is silica having a pore size of at least 40 Angstroms.

11. The product of claim 6 wherein said 1-alkene is selected from 1-octene, 1-decene, 1-dodecene, and mixtures thereof.

12. The product of claim 11 wherein said olefin is 1-decene.

13. The product of claim 1 wherein said epoxidizing agent is an aliphatic or aryl percarboxylic acid, hydrogen peroxide, or mixtures thereof.

14. A lubricant composition comprising a mixture of 2-dialkyl oxirane and 1,2-dialkyl oxirane having between an average of 30 and 1000 carbon atoms, a branch ratio of less than 0.19, pour point of less than $-15°$ C. and VI above about 130.

15. The composition of claim 14 having a weight average molecular weight between 300 and 150,000, number average molecular weight between 300 and 30,000 and molecular weight distribution between 1 and 5.

16. The composition of claim 15 having a viscosity between 3 cs and 500 cs, VI between 130 and 280 and a pour point between $-15°$ C. and $-70°$ C.

17. The composition of claim 14 wherein said oxirane is $C_{30}$ oxirane.

18. The composition of claim 15 wherein the ratio of carbon atoms to oxygen is at least 30 to 1.

19. A lubricant composition containing the recurring polymeric structures

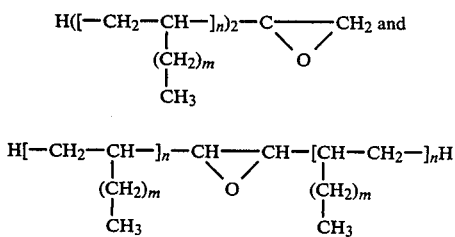

where m is 3 to 12 and where the combination of n recurring units is 3 to 500.

20. The composition of claim 19 where m is seven and the average n is fifteen.

21. The composition of claim 19 having a viscosity index greater than 130 and a pour point less than $-15°$ C.

22. A method for decreasing wear and reducing friction in an internal combustion engine by lubricating said engine with a friction reducing amount of a product of reaction made by epoxidizing $C_{30}+$ polyalpha-olefin oligomeric hydrocarbon lubricant having a branch ratio of less than 0.19 and pour point below $-15°$ C. in the presence of an epoxidizing amount of an epoxidizing agent.

23. The method of claim 22 wherein said product has a weight average molecular weight between 300 and 150,000, number average molecular weight between 300 and 30,000, molecular weight distribution between 1 and 5, a viscosity between 3 cs and 500 cs, VI between 130 and 280 and a pour point between $-15°$ C. and $-70°$ C.

24. A method for scavenging water and decreasing corrosion in an internal combustion engine by lubricating said engine with a lubricant containing a water reactive amount of a product of reaction made by epoxidizing $C_{30}+$ polyalpha-olefin oligomeric hydrocarbon lubricant having a branch ratio of less than 0.19 and pour point below $-15°$ C. in the presence of an epoxidizing amount of an epoxidizing agent.

25. The method of claim 23 wherein said polyalpha-olefin comprises the unsaturated oligomeric or co-oligomeric residue of the oligomerization of $C_6-C_{20}$ 1-alkene in contact with reduced valence state chromium oxide catalyst on silica support at a temperature between $90°$ C. and $250°$ C.

26. A lubricant mixture having enhanced viscosity index comprising,
a lubricant composition comprising a mixture of 2-dialkyl oxirane having between an average of 0.1 to 10 weight percent 30 and 1000 carbon atoms, a branch ratio of less than 0.19, pour point of less than $-15°$ C. and VI above about 130 and;
liquid lubricant taken from the group consisting essentially of mineral oil, hydrogenated polyolefins, vinyl polymers, polyflurocarbons, polyethers, polychlorofluorocarbons, polyesters, polycarbonates, polyurethanes, polyacetals, polyamides, polythiols, their copolymers, terepolymers and mixtures thereof.

27. The lubricant mixture of claim 26 wherein said mineral oil comprises $C_{30}+$ hydrocarbons, said hydrogenated polyolefins comprise polyisobutylene, polypropylene and polyalpha-olefins with a branch ratio greater than 0.19, said vinyl polymers comprise polymethylmethacrylate and polyvinylchloride, said polyflurocarbons comprise polytetrafluoroethylene, said polychloroflurocarbons comprise polychlorofluroethylene, said polyesters comprise polyethyleneterephthalate and polyethyleneadipate, said polycarbonates comprise polybisphenol A carbonate, said polyurethanes comprise polyethylenesuccinoylcarbamate, said polyacetals comprise polyoxymethylene, said polyamides comprise polycaprolactam, said polyethers comprise polyethyleneglycol, and copolymers thereof.

28. The mixture of claim 26 further comprising between 0.1 and 10 weight percent lubricant additives taken from the group consisting of dispersants, detergents, viscosity index improvers, extreme pressure/antiwear additives, antioxidants, pour depressants, emulsifiers, demulsifiers, corrosion inhibitors, antirust inhibitors, antistaining additives, friction modifiers, and the like.

29. The composition according to claim 19 further comprising between 0.1 pl and 10 weight percent lubricant additives taken from the group consisting of dispersants, detergents, viscosity index improvers, extreme pressure/antiwear additives, antioxidants, pour depressants, emulsifiers, demulsifiers, corrosion inhibitors, antirust inhibitors, antistaining additives, friction modifiers, and the like.

* * * * *